United States Patent
Lammens et al.

(10) Patent No.: US 8,445,606 B2
(45) Date of Patent: May 21, 2013

(54) HIGH PRESSURE POLYMERIZATION PROCESS

(75) Inventors: Henri A. Lammens, Antwerp (BE);
Tom Van Nuland, Sterrebeek (BE); Ivo T. Goossens, Kapelle-Op-Den-Bos (BE);
Roger L. Claessens, Berlaar (BE);
Geert Vaes, Hollestraat (BE); Paul Jan Clymans, Kapelle-Op-Den-Bos (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 45 days.

(21) Appl. No.: 13/129,270

(22) PCT Filed: Dec. 18, 2008

(86) PCT No.: PCT/US2008/087501
§ 371 (c)(1), (2), (4) Date: Jul. 28, 2011

(87) PCT Pub. No.: WO2010/071653
PCT Pub. Date: Jun. 24, 2010

(65) Prior Publication Data
US 2011/0275770 A1 Nov. 10, 2011

(51) Int. Cl.
C08F 2/00 (2006.01)
C08F 210/00 (2006.01)
C08G 85/00 (2006.01)
B01J 19/00 (2006.01)
B01J 19/18 (2006.01)

(52) U.S. Cl.
USPC ............... 526/64; 526/68; 526/71; 526/348; 422/131; 422/134

(58) Field of Classification Search
USPC ................. 526/64, 68, 71, 348; 422/131, 134
See application file for complete search history.

(56) References Cited

U.S. PATENT DOCUMENTS

| | | | |
|---|---|---|---|
| 3,299,033 | A | 1/1967 | Douglas |
| 3,509,115 | A | 4/1970 | French |
| 3,628,918 | A | 12/1971 | Beals et al. |
| 3,714,123 | A | 1/1973 | Mancini et al. |
| 4,175,169 | A | 11/1979 | Beals et al. |
| 4,215,207 | A * | 7/1980 | Durand et al. ............... 526/64 |
| 4,342,853 | A | 8/1982 | Durand et al. |
| 5,068,130 | A | 11/1991 | Decolibus |
| 2003/0114607 | A1 | 6/2003 | Donck |
| 2003/0181632 | A1 | 9/2003 | Mahling et al. |

FOREIGN PATENT DOCUMENTS

| | | |
|---|---|---|
| EP | 1 080 116 | 3/2001 |
| EP | 1 162 244 | 12/2001 |
| EP | 1 529 785 | 5/2005 |
| GB | 336339 | 10/1930 |

(Continued)

*Primary Examiner* — William Cheung
(74) *Attorney, Agent, or Firm* — Robert L. Abdon; Samuel E. Shehadeh

(57) ABSTRACT

The invention relates to high pressure tubular reactor olefin polymerization plants having improved specific energy consumption. The plants may be newly constructed or made by de-bottlenecking an existing plant. The tube of the tubular reactor may have improved arrangements for cooling to increase conversion and optimized polymer-recycle gas separation arrangements using a jet pump for recycling unreacted monomer while permitting haze to be maintained. The improved cooling arrangements include a reduced pressure cooling zone forming the tail end of the tube and/or a shortened heating zone for the front feed and allowing more monomer to be fed as a side feed.

18 Claims, 5 Drawing Sheets

FOREIGN PATENT DOCUMENTS

| | | |
|---|---|---|
| GB | 1 338 280 | 11/1973 |
| GB | 1 593 661 | 7/1981 |
| WO | WO 2007-018870 | 2/2007 |
| WO | WO 2007-018871 | 2/2007 |
| WO | WO 2007-134670 | 11/2007 |
| WO | WO 2007-134671 | 11/2007 |

* cited by examiner

HIGH PRESSURE POLYMERIZATION PROCESS

PRIORITY CLAIM

This application is a National Stage Application of International Application No. PCT/US2008/087501 filed Dec. 18, 2008, which is hereby incorporated by reference in its entirety.

FIELD OF INVENTION

The invention relates to methods for de-bottlenecking and/or reducing the power consumption of continuous tubular olefin polymerization plants and processes using free radical polymerization. The invention relates especially to such plants and processes employing multiple initiator injection points for a plurality of cooled reaction zones. The invention includes the de-bottlenecking by modifying existing, multiple injection point tubular reactor to increase plant capacity and/or reduce the power consumption.

BACKGROUND OF INVENTION

Continuous high pressure tubular reactor polymerization plants convert relatively low cost olefin (generally ethylene) monomer feeds into valuable polyolefin product. The polymerization takes place at high temperatures and pressures and is highly exothermic. The high pressure polymerization takes place in the tubular reactor through which the polymerizing mixture passes in a turbulent, plug flow manner. The tubular reactor is constructed from a number of tube segments that are coupled together to make up the total tube length. As used herein the term "tube" refers to the totality of the tube segments that are coupled together.

The olefin monomer is generally ethylene but ethylenically copolymerizable monomers may be used as comonomers, such as vinyl acetate. The term "polymer" is used herein thus includes homopolymers and copolymers incorporating units derived from one or more comonomers. The term "polyethylene" refers to ethylene based polymers containing more than 50 mol % of ethylene derived units.

Typical commercial plants have total tube lengths varying from 500 to 3000 meters with a tube diameter of 20 to 100 mm and operate at 1500 to 3500 bar (150-350 MPa) and 120 to 350° C. Production is on a large scale, up to 200 kiloton (kT) per year and above. Electrically powered compressors may consume 25 megawatt (MW) or more annually of electricity. More energy is consumed in the form of steam to heat the feed to the "reaction start temperature" at which polymerization commences. This temperature is sometimes referred to as the "light off" temperature.

The plants generally use two compressors, each with multiple stages, arranged in series: a primary compressor provides an initial compression of the monomer feed and a secondary compressor increases the pressure generated by the primary compressor to the level at which polymerization takes place. The compressors may use intercoolers to shed the heat generated by compression.

The tube usually has an initial part, referred to herein as the "heating zone" to heat compressed monomer feed to the reaction start temperature. This is generally referred to as the "front feed." A hot fluid, such as steam, flows through jackets surrounding the tube segments to effect heat exchange using the internal heat exchange surface area formed by the tube segments. Once the reaction start temperature is reached, initiator is injected into the tube and decomposes into free radicals that initiate polymerization. Parts of the tube downstream of the point at which the initiator is injected, form one or more reaction zones where polymerization takes place and the temperature rise caused by polymerization is counteracted by external cooling of the tube cooling or admixture of fresh monomer feed. The downstream portion of the tube is used to cool the compressed mixture of polymer and unreacted monomers for subsequent processing.

The terms "upstream" and "downstream" as used herein refer to the direction of the flow of monomer and polymer through the plant beginning with the monomer source, the compression and polymerization and terminating with the finishing stages for the polymer product, unless another meaning is clear from context.

A coolant fluid such as water may cool the tube externally. Heat exchange is effected using the internal heat exchange surface area formed by the tube segments that are cooled. The coolant fluid flows through cooling jackets surrounding the tube segments. The total internal surface area of the tube involved in the heat exchange is calculated (a) from the axial length of the tube subject to such cooling and (b) from the internal diameter of the bore, which may vary along the axial length tube to be considered.

In some types of plant the cooling fluid may be "cold" which means that the coolant is kept at a temperature below the melting point of the polymer. In other types of plant the cooling fluid may be "warm" or "hot" which means that the coolant is kept at a temperature above the melting point of the polymer. The cooling fluid is often pressurized water to allow cooling water to reach temperatures in excess of 100° C. The "waste" heat so removed by the coolant fluid can be used to generate heat or steam for other functions of the continuous polymerization process or for use outside of the polymerization process itself.

The efficiency of a continuous tubular reactor plant can be expressed in different ways. One measure is the amount of energy consumed per unit polymer produced, referred to as the "specific energy consumption". Conventionally this is in the region of 0.8 kilowatt hours per kilogram of polyethylene (PE) produced for large scale reactors. The numerator depends primarily on the energy used to drive the compressors. Additional energy consumed in generating steam of sufficiently high pressure for heating feed to the reaction start temperature is not reflected in the specific energy consumption. The denominator is influenced by the extent of conversion of the feed into polymer along the length of the tube.

The "conversion" as used herein is the weight percentage of monomer fed into the tubular reactor that is converted into polymer during its passage through the tube based on the weight of monomer supplied to the tube. Another measure of plant efficiency is the nominal capacity that is the total amount of polymer that can be produced per year which is equivalent to the annual monomer consumption. The nominal capacity is a function of the compression capacity and the conversion.

Conversion may be increased by providing a number of reaction zones spaced along the length of the tubular reactor (see WO2007-018870 and WO2007-018871). Ethylene having a temperature less than that of the fluid inside the tube may be injected at such downstream reaction zones, thus cooling the fluid passing along the tube. These are generally referred to as "side feeds". Conversion may be further increased by cooling these side feeds to increase the cooling effect (see, for example, paragraph [0003] in WO2007-018871) and reducing the reliance on external cooling through the tube walls as described above.

While the bulk of the reactor mixture passing through the tube, sometimes referred to as the "fluidum", will be in single phase, the external cooling of the tube, especially with a cold coolant fluid, can result in fouling of the interior walls of the tube by polymer deposits. The foulant build up reduces the heat transfer and so the possible conversion of monomer to polymer in the tube. The build up of the foulant can be counteracted for example by maintaining a state of turbulent flow in the tube (see U.S. Pat. No. 3,628,918 and U.S. Pat. No. 4,175,169) and by pulsing ("bumping") the flow through the tube (see U.S. Pat. No. 3,299,033 and U.S. Pat. No. 3,714,123).

Process control systems aim to provide the right mixture and temperature for each reaction zone using thermocouples at appropriate intervals in "rings" also referred to as "gaskets" clamped and sealed between adjacent tube segments. The temperature profile that results from the successive polymerization reactions and the cooling associated with the tube is measured by the thermocouples located in the rings. A target temperature profile can be maintained by varying the rate of injection, and types and combinations of free radical initiator, monomer and optionally transfer agent which is used to control the molecular weight of the polymer.

In conventional reactors the heated stream of tubular reactor effluent emerging at the downstream end of the tube is a single phase mixture containing polymer, unreacted monomer and residual transfer agent, if any. Conversions generally exceed 20% when using multiple reaction zones. The effluent first passes a pressure let down valve (referred to herein as the "let-down valve") at the downstream end of the tube. The let-down valve lowers the effluent pressure so that the effluent is no longer in the single phase and starts to form two phases, a monomer rich phase with unreacted monomer and a polymer rich phase.

The two phase mixture is progressively separated in successive separation stages. Separated leftover reactants, such as unreacted monomer, are recycled to back to the compressors. The materials recycled can be referred to collectively as the "recycle gas". The successive separation stages may include a cascade of separation vessels or "separators" which separate the polymer from the two-phase mixture until at the conclusion solid polymer pellets are obtained at ambient conditions of temperature and pressure. WO2007-018870 and WO2007-018871 show a conventional separation in a cascade of two vessels, a high pressure separator in the uppermost location (i.e. furthest upstream) and a low pressure separator in the lowermost location (i.e. furthest downstream), with the overhead of the high pressure separator conveyed to the inlet of a secondary compressor.

U.S. Pat. No. 4,342,853 describes the use of three separation stages, with an intermediate separator located between an high pressure separator and low pressure separator. In the specification and claims the intermediate separator is referred to as the medium pressure separator. The high pressure separator overhead is passed as a recycle gas stream to the secondary compressor. The overhead of the medium pressure separator is conveyed as a recycle gas stream to the inlet of the primary compressor with the purpose of improving energy efficiency and removal of residual gases. The manner in which the overhead from the low pressure separator is treated is not described.

GB1338280 mixes fresh ethylene after compression with the reacted mixture after pressure reduction to cool or "quench" the two phase effluent to avoid decomposition reactions, chain transfers, oxidation, branching and cross-linking that detract from the product quality, especially optical properties such as haze. U.S. Pat. No. 3,509,115 is similar.

WO2007-134671 uses an high pressure separator and low pressure separator only. Part of the kinetic energy of the reactor effluent is used to power a jet pump which takes part of the high pressure separator overhead recycle gas stream that has been cooled in a waste heat boiler to generate steam and recycle it to the high pressure separator. In this way, a cooled stream is provided that at least partially replaces the fresh ethylene stream of GB1338280 and U.S. Pat. No. 3,509,115. By using the jet pump to generate a quench stream from a cooled portion of the recycle gas, the need to compress monomer in the primary compressor to provide a quench stream is reduced.

WO2007-134670 discloses a separation and recycle arrangement using an intermediate separator, medium pressure separator between an high pressure separator and an low pressure separator. A jet pump is arranged so that the kinetic energy of the effluent is used to convey the medium pressure separator overhead and combine it with the effluent downstream of a let down valve. Unlike U.S. Pat. No. 4,342,853, which conveys the medium pressure separator overhead to the inlet of the primary compressor, in WO2007-134670 the medium pressure separator overhead is passed through the jet pump and high pressure separator to the recycle gas flowing to the inlet of the secondary compressor. In this way the need to recompress recycle gas in the primary compressor is reduced (see paragraph [0011]).

US2003-0114607 describes a continuous tubular reactor operation in which high conversions are pursued in combination with good optical properties such as haze, by injecting chain transfer agent preferentially with the front feed (see paragraph [0008] and [0010]). The dependence between the monomer concentration and chain transfer agent is uncoupled (see paragraph [0017]). In this way higher conversions can be combined with good optical properties.

It is among the objects of the invention to lower the specific energy consumption of a tubular reactor plant, and especially to lower the specific energy consumption without increasing tube length and nominal compressor duty. It is also among the objects to increase the amount of polymer produced for a given compressor capacity and/or to reduce the amount of electricity consumed by the compressors for producing the same amount of polymer. It is further among the objects to reduce the specific energy consumption and increase the conversion and plant capacity without reducing the polymer quality, especially the optical properties, such as haze. More specifically it is among the objects of the invention to improve increase conversion by permitting more reaction zones to be accommodated within a given tube length and improve extraction of unreacted components from the tube effluent.

SUMMARY OF INVENTION

The invention relies on modifications and improvements for a continuous tubular reactor polymerization plant, which modifications and improvements are in certain cases known individually from the prior art such as that discussed in the BACKGROUND, above. In the invention various individual modifications and improvements act in combination to improve plant efficiency. The modifications and improvements are selected and combined so as to obtain the improved plant efficiency in a simple, low cost manner. To this end modifications and improvements relating the to the tube portion itself may be combined with improvements in the separation and recycle cascade to obtain parallel improvements both in the course of the polymerization proper in the tube as well as in the subsequent separation and the recycling arrangements.

The modifications and improvements of this invention can be applied to an existing plant to increase its efficiency in terms of specific energy consumption and plant capacity. "De-bottlenecking" as used herein means modification of the plant affecting only those parts thereof that limit its capacity in terms of its annual production capacity. De-bottlenecking can create extra capacity at much lower cost than enlarging capacity by constructing a new plant. The de-bottleneck capacity increases may be achieved by increasing conversion and may be associated with an improvement in the specific energy consumption. The same modifications and improvements as are used for de-bottlenecking and increasing plant capacity can also be used to reduce energy consumption by reducing the extent of monomer compression, so reducing the consumption of electricity rather than using the improved efficiency to produce more polymer product.

The modifications and improvements of this invention may also be used for new plants to be constructed. In the specification and claims optional features described in the context of the de-bottlenecking method can be applied equally in the construction of new plants. The operation of such new or de-bottlenecked plants also leads to a new and advantageous polymerization processes that are separately described and claimed.

In a first aspect of the invention improvements are introduced to improve heat removal from the tube by improved external cooling. In this aspect the invention provides a method of de-bottlenecking and/or reducing the power consumption of an existing plant for continuously polymerizing olefins using free radical initiators, which plant includes:

(i) compressor means for compressing monomer with a primary and a secondary compressor to a pressure of from 1500 to 3500 bar (150-350 MPa), (ii) a tube having a heating zone at the upstream end for providing an internal heating surface for monomer supplied from the compressor means and at the downstream end a plurality of lengthwise spaced reaction zones for polymerizing the compressed feed using free radical initiator(s) under single phase conditions and cooling means associated with the reaction zones surrounding the tubes for providing an internal cooling surface for removing heat from the polymerization reaction mixture under single phase conditions, and (iii) means for letting down pressure to produces two phase conditions, means for separating effluent from the tube into polymer and unreacted monomer and means for recycling unreacted monomer to the compressor means, in which de-bottlenecking method involves modifying the downstream part of the tube to provide a reduced pressure cooling zone for providing two-phase conditions upstream of the downstream end of the tube and an internal cooling surface to cool the effluent inside the tube subsequent to pressure reduction. The term "reduced pressure cooling zone" uses the word "reduced" relative to the higher pressure in the upstream reaction zones. The extent of the reduction can be controlled in use to cause the fluidum to change from the single phase mixture into a two phase mixture that can be subjected to the various separation steps. The precise pressure in the reduced pressure cooling zone in use can vary depending on the pressure of the fluidum upstream and on the desired pressure and flow rates for downstream separation and recycling arrangements.

The reduced pressure cooling zone can be accommodated without substantially changing the tube length existing before the de-bottlenecking. The tubular reactor effluent fluid passing through the reduced pressure cooling zone is cooled efficiently under reduced pressure conditions, permitting a greater heat removal by external cooling than without pressure reduction. The use of a cold quench stream of monomer compressed in the primary compressor (as in GB1338280) can be reduced or avoided. The quench/cooling capacity of the tube overall can be increased so as to permit higher conversion levels without significantly reducing the optical properties, such as haze.

Suitably the reduced pressure cooling zone has a bore which is the same or, more preferably, less than the bore of the tube portion at the downstream end having single phase conditions. This helps maximize turbulence and hence cooling. The reduced pressure cooling zone may occupy from 40 to 65% of the total tube length, preferably from 50 to 60%. The upstream end of the reduced pressure cooling zone is defined by some means employed to reduce the pressure in the tube. The pressure reducing means ma be a pressure let down valve, preferably arranged to be cooled by a cooling fluid, at the upstream beginning of the reduced pressure cooling zone.

In a second aspect of the invention improvements are introduced to reduce the heat input for the front feed and increase the opportunity for polymerization and heat removal downstream. In this second aspect the invention provides a method of de-bottlenecking and/or reducing the power consumption of an existing plant for continuously polymerizing olefins using free radical initiators, which plant includes (i) compressor means for compressing monomer with a primary and a secondary compressor to a pressure of from 1500 to 3500 bar (150-350 MPa), (ii) a tube having a heating zone at the upstream end for providing an internal heating surface for monomer supplied from the compressor means and a plurality of lengthwise spaced reaction zones for polymerizing the compressed feed using free radical initiator(s) under single phase conditions and cooling means associated with the reaction zones surrounding the tubes for providing an internal cooling surface for removing heat from the polymerization reaction mixture under single phase conditions, and (iii) means for letting down pressure to produce two phase conditions, means for separating effluent from the tube into polymer and unreacted monomer and means for recycling unreacted monomer to the compressor means, which involves reducing the internal heated surface of the heating zone to from 5 to 10% of the total internal surface area of the tube and extending the internal cooled surface to the remainder of the internal tube surface. The downstream end of the heating zone is defined by the location at which the first initiator injection point is located. The internal heat exchange surface area of the tube involved in the heat exchange is calculated (a) from the axial length of the tube of the specified tube part such as the heating zone and (b) from the internal diameter of the bore which may vary along the length of that specified part of the tube. The total internal heat exchange surface area of the tube involved in heat exchange includes the combined surface areas of the tube that are cooled or heated along the length of the tube. The remainder of the internal tube surface includes all of the tube downstream of the heating zone, including the reduced pressure cooling zone. In practice the full length of each reaction zone is cooled, including the parts of the reaction zone where the polymerization exotherm causes the temperature to rise. The reduction may be implemented principally by reducing the length of the heating zone, and optionally reducing the internal diameter of the heating zone to from 30 to 55 mm, for example by 5 to 15%. The internal diameter of the heating zone is preferably smaller than that of the downstream reaction zones and/or that of the reduced pressure cooling zone. The length of the heating zone may be from 8 to 15% of the overall tube length.

Less heat is then used to heat the front feed up to the reaction start temperature. Suitably the length of the tube which is heated to bring the compressed feed to the reaction start temperature is reduced by from 20 to 60% of its original length. The proportion of the compressed feed supplied to reaction zones in the tube through side feeds downstream of the heating zone can be increased at the expense of the proportion brought to the reaction start temperature for the front feed. An additional side feed may be introduced to create an additional reaction zone in a part of the tube used prior to the debottlenecking for heating the front feed.

The modifications and improvements of the first and aspect above each contribute to maximizing the cooling capacity of the tube overall and hence the potential production capacity of the tube. The reduced length heating zone allows more of the length of the tube heat to transfer to the coolant. The combined length of the reaction zones between the heating zone and the reduced pressure cooling zone may be from 25 to 40% of the overall tube length.

Using the aforementioned aspects either alone or in combination, the increased flows of polymer and unreacted materials resulting from increased conversion can be subjected to a high efficiency separation and recycling procedure, requiring only limited modification of a pre-existing cascade of separators.

Suitably (i) a jet pump means is incorporated to pump the overhead from an intermediate pressure separator into the two-phase cooled reactor effluent stream from the downstream end of the tube for supply to a high pressure separator, (ii) at least part of the overhead recycle of the high pressure separator is passed to the inlet side of the secondary compressor. This permits the plant to be operated such that the balance between the recycle gas mass flow to the primary compressor and that to the secondary compressor can be changed to increase the amount of recycle gas recycled to the secondary compressor. Thus (iii) the proportion of the unreacted monomer recycled to the secondary compressor from the medium pressure separator is increased at the expense of the proportion of the unreacted monomer recycled to the primary compressor from a low pressure separator.

Advantageously the jet pump means may, in addition to the pumping the overhead of the intermediate pressure separator, divert part of the overhead stream from the high pressure separator past a cooling heat exchanger and pump the cooled flow to join the two-phase cooled reactor effluent stream. The combined flow is passed to the high pressure separator. This complements the cooling or quenching in the reduced pressure cooling zone. The jet pump means may be a single jet pump having inlets for the diverted high pressure separator overhead as well as the overhead from the intermediate pressure separator. The jet pump means may be arranged to divert less than 30% of the overhead stream from the high pressure separator past the cooling heat exchanger.

DETAILED DESCRIPTION OF THE INVENTION

Figure 1:
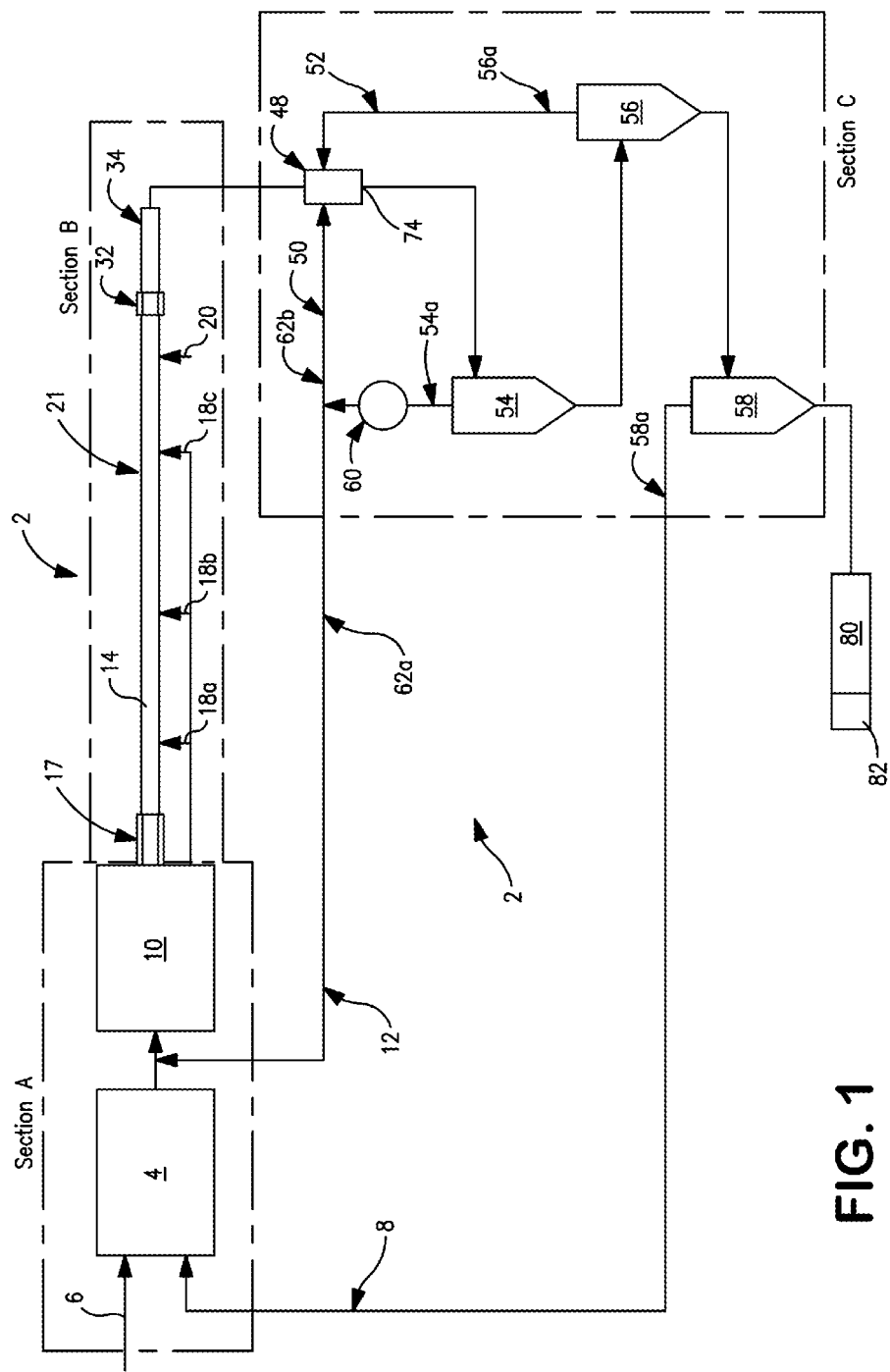
FIG. 1 is a schematic view of a tubular reactor ethylene polymerization plant according to the invention.

The let down valve may be cooled by a cooling fluid so that the valve is less affected by the higher effluent temperatures it may encounter downstream of the final reaction zone. The valve may be adapted to permit periodic opening to bump the reactor and reduce fouling of the interior tube walls. A reduced diameter of the bore of the reduced pressure cooling zone, which generally is downstream of any let down valve, is preferred because helps ensure a higher flow speed that breaks up the polymer-rich phase and reduces or eliminates a boundary fouling layer that would detract from the heat transfer through the tube wall.

All of the features resulting from the bottlenecking described herein may be applied equally in the description and in the claims to new plants to be constructed and processes.

The primary compressor preferably receives recycle gas dissolved in the concentrated polymer from the overhead of the low pressure separator. In this manner the higher capacity and conversion can be accommodated in the separation and recycling facilities, without increasing compression duty or requiring compressor replacement or modification. At the same time the specific energy may be reduced as a result of the aforementioned modifications, whether applied in de-bottlenecking or to a newly constructed plant by achieving a higher conversion and/or a reduction in the polymerization pressure and associated electricity consumption.

Suitably the single jet pump having the inlet for the diverted high pressure separator overhead and the overhead from the intermediate pressure separator may be provided with means, such as a check valve, to restrict flow from the hot overhead of the intermediate separator into the cold diverted high pressure separator overhead, so as to avoid undesirable fouling by polymer and/or waxes. The use of the single jet pump simplified the overall construction.

The length of the tube occupied by the reduced pressure cooling zone may be greater than the tube length freed by the reduction in length of the heating zone. The reduction in length of the heating zone increases the length of the tube available for external cooling of the reaction zones while the improved cooling in the reduced pressure cooling zone lowers the effluent exit temperature to reduce the need for quenching with a cold monomer stream.

The increased cooling capacity of the tube and the increased ability to absorb the polymerization exotherm by increasing the proportion of feed supplied as a side feed, may reduce or eliminate the need to cool the side feeds. The consumption of (expensively) chilled cooling water to cool side feeds may then be reduced or eliminated. The reduction in the share of the monomer fed as a front feed at the expense of the side feeds, also permits the transfer agent to be more concentrated in the front feed and the concentration of transfer agent supplied via side feeds to be reduced. This may help reduce haze and/or permit an increase in conversion at the same haze level.

This reduced use of the jet pump for supplying a cold "quench" flow of monomer from cooled recycle gas from the high pressure separator overhead permits an increased use of the jet pump to increase extraction of overhead of the intermediate separator for recycling to the secondary compressor. The same jet pump can however, if needed, still be used to provide some additional cold monomer flow for further cooling the effluent. The increased extraction of the intermediate separator overhead, reduces the proportion of unreacted monomer that remains to be separated in the low pressure separator for recompression by the primary compressor and/or permits increased flow volumes to be subjected to separation without overloading the circuit leading to the primary compressor and the primary compressor itself. The proportionately reduced flow of overhead recycle gas from the low pressure separator permits an increase in flow of make up monomer to the primary compressor and a higher conversion without overloading the means used to separate the polymer and the recycle gas. This can provide an especially cost-effective de-bottleneck or a reduced investment cost for a new plant to be constructed.

In yet a further aspect the invention concerns the final plant as may be constructed through a de-bottleneck or by fresh construction of a new plant. In this aspect, the invention provides a plant for continuously polymerizing olefins using free radical initiators at single phase temperature and pressure, which plant includes
  (i) compressor means for compressing monomer with a primary and a secondary compressor to a pressure of from 1500 to 3500 bar (150-350 MPa),
  (ii) a tube having a heating zone at the upstream end for providing an internal heating surface for monomer supplied from the compressor means and a plurality of lengthwise spaced reaction zones for polymerizing the compressed feed using free radical initiator(s) under single phase conditions and cooling means associated with the reaction zones surrounding the tubes for providing an internal cooling surface for removing heat from the polymerization reaction mixture under single phase conditions, and
  (iii) means for letting down pressure to produce two-phase conditions, means for separating effluent from the tube into polymer and unreacted monomer and means for recycling unreacted monomer to the compressor means,
  in which said tube has a reduced pressure cooling zone for providing two-phase conditions upstream of the downstream end of the tube and an internal cooling surface to cool the effluent inside the tube subsequent to pressure reduction and/or in which the internal heated surface of the heating zone is from 5 to 10% of the total internal surface area of the tube and optionally the internal cooled surface extends substantially to the remainder of the internal tube surface.

The plant may have the same construction options as is discussed in the context of the steps taken to de-bottleneck and/or reduce the power consumption of an existing plant. Suitably the plant has separating and recycling means for unreacted monomer in the effluent, including (a) a jet pump to receive the effluent from final tube section, (b) a high pressure overhead recycle connected to a high pressure separator via a cooling heat exchange means to an inlet side of the secondary compressor, (c) a medium pressure overhead connected to a medium pressure separator to a first inlet of the jet pump, the jet pump having optionally a second inlet for providing fluid communication with a part of the cooled high pressure overhead recycle, with (d) the overhead of low pressure separator, which receives a polymer rich phase from the medium pressure separator, being connected to the inlet side of the primary compressor.

In yet a further aspect, the invention relates to polymerization processes that may be performed on plants as aforementioned. In this aspect, the plant, whether constructed by a de-bottleneck or not can be used in a manner that helps materialize the potential benefits in conversion, capacity and specific energy. Accordingly the invention provides a process for continuously polymerizing olefins using free radical initiators at single phase temperature and pressures in a plant which includes
  (i) compressor means for compressing monomer with a primary and a secondary compressor to a pressure of from 1500 to 3500 bar (150-350 MPa),
  (ii) a tube having a plurality of lengthwise spaced reaction zones for polymerizing the compressed feed using free radical initiator(s) under single phase conditions and cooling means surrounding the tubes for removing heat from the polymerization reaction mixture under single phase conditions, and
  (iii) means for letting down pressure to produce two-phase conditions, means for separating effluent from the tube into polymer and unreacted monomer and means for recycling unreacted monomer to the compressor means, which process comprises:
  A) feeding from 12 to 50%, preferably 14 to 40%, based on the total mass flow of the feed compressed in the secondary compressor to an upstream end of the tube for lighting off of the feed and feeding the balance of the total volume of the feed compressed in the secondary compressor as side feeds into the tube;
  B) cooling the effluent produced following polymerization inside the tube at the down stream end subsequent to the letting down of the pressure to produce two-phase conditions using fluid for cooling that downstream end externally;
  C) feeding from 50 to 85%, preferably 60% to 80%, based on the total mass flow from the secondary compressor generated by a high pressure separator to the inlet side of the secondary compressor and making up the balance on the total overhead generated by a high pressure separator with monomer compressed by the primary compressor;
  D) using jet pump means to pump the overhead from an intermediate pressure separator into the stream from the cooled effluent from the downstream end of the tubular reactor before the effluent enters the high pressure separator;
  E) using the jet pump means to divert less than 30% of mass flow of the overhead stream from the high pressure separator past a cooling heat exchanger into the stream from the cooled effluent from the downstream end of the tubular reactor for entering the high pressure separator;
  F) supplying fresh make up monomer to the primary compressor and making up the balance of the total volume supplied to the primary compressor with an overhead stream from a low pressure separator which receives a polymer rich fraction from the intermediate pressure separator.

Improved removal of the gaseous, unreacted components in the medium and high pressure separators may assist in reducing the residual monomer content in the polymers pellets produced after extrusion to from 800 ppm to 200 ppm or permit the total flow to be increased when the capacity of the plant is increased.

In yet a further aspect of the invention, the free radical injection is optimized to take advantage of the greater capacity of the separation and recycling system to handle higher conversions while avoiding a reduction in the optical properties. In this aspect the invention provides a process for continuously polymerizing olefins using free radical initiators at single phase temperature and pressures in a plant comprising:

(i) compressor means for compressing monomer with a primary and a secondary compressor to a pressure of from 1500 to 3500 bar (150-350 MPa), (ii) a tube having a plurality of lengthwise spaced reaction zones for polymerizing the compressed feed using free radical initiator(s) under single phase conditions and cooling means surrounding the tubes for removing heat from the polymerization reaction mixture under single phase conditions, and (iii) means for letting down pressure to below two phase conditions, means for separating effluent from the tube into polymer and unreacted monomer and means for recycling unreacted monomer to the compressor means, which process comprises feeding at least at the final free radical injection point from 2 to 30% based on the total weight of initiator of an initiator having a 1 second half time decomposition temperature at 2000 bar (200 MPa) of at least 250° C. so as to raise the peak temperature in the final reaction zone to at least 285° C. The peroxide may be tested in a solvent such as pentane and is preferably di-tertiary butyl peroxide.

Benefits of Invention

Using the invention the specific energy consumption is reduced. Additional monomer can be converted. The conversion and plant capacity can be increased and/or the electricity and energy consumption overall can be reduced. The additional heat of polymerization generated and improved heat removal reduces the amount of heat needed from external sources for such functions as raising steam for heating the front feed to the reaction start temperature. The secondary compressor may be run at a lower discharge pressure allowing a reduction in the specific energy consumption with a comparable production capacity. This can also lengthen service intervals for the compressors.

The above benefits can be realized on existing tubular reactors by relatively simple de-bottlenecking modifications involving creating an additional reaction zone; tapping the kinetic energy of the effluent to pump up increasing amounts of low pressure overhead gas to a pressure suitable for recycling to the secondary compressor; and installing an intermediate pressure separator that permits the low pressure separator to remove proportionately less overhead for recycling to the primary compressor. The compressor capacity can be left unchanged as can the arrangements for cooling/quenching and de-waxing the overhead streams from the different separating stages. The finishing provisions (extruder, pelletizer, polymer purge bins etc.) can typically also serve the without major change in spite of the greater capacity of the de-bottlenecked plant.

Additional cooling of the let down valve and the effluent stream permits use of the existing provisions for bumping and cleaning the inside tube walls from fouling including the temporary heating of the cooling jackets for the different reaction zones downstream of the heating zone.

EXAMPLE

General Set Up and Operation of the Plant

With reference to FIG. 1, a continuous tubular reactor polymerization plant 2 contains three main sections:

Section A: Compressor equipment and its associated cooling arrangements that raise the pressure of incoming monomer, such as ethylene and optionally one or more comonomers, to the working pressure for polymerization.

Section B: A tubular reactor with its free radical initiator and monomer injection arrangements where the compressed feed is polymerized to the targeted conversion in a single phase condition;

Section C: The separator cascade and associated cooling arrangements that remove the polymer from the reactor effluent and cool and recycle the unreacted components in the effluent back to Section A.

The invention can be used to increase the plant production capacity. To this end higher conversion is employed. More polymer of suitable quality, of which the most critical are generally the optical properties such as haze, may be produced with the same energy consumption or the same amount of polymer may be produced with less energy for a given plant. To achieve an increase in capacity by changing Section A in isolation would be difficult. Modification and/or replacement of compressor equipment would be costly. Thus any de-bottlenecking of an existing plant requires an increase in the polymerization capacity of the tubular reactor in Section B while at the same time adapting the separator cascade and recycle system in Section C remain within existing capacities for the recycle volume of unreacted components.

The particular combination of plant modifications and improvements discussed below permit a greater throughput without increasing installed compressor capacity. The whole plant will be described to describe the modifications in the overall plant context. The same overall construction can of course also be applied to a new plant to reduce investment and operating costs.

To explain the changes in Section B in more detail, reference is made to FIG. 1. A multi-stage primary compressor 4 compresses fresh make up monomer of ethylene and the optional comonomer that are supplied by a feed line 6 in a second stage of that compressor and also compresses recycle gas supplied by a line 8 from a low pressure separator recycle of the separator cascade in a first stage of that compressor (the compressor stages are arranged conventionally and are not shown in detail). The compressor 4 brings the combined supply to typically 300 bar (30 MPa). A multi-stage inter-cooled secondary compressor 10 compresses the output of the primary compressor 4 and also compresses a recycle gas supplied by line 12 from a high pressure overhead separator of the separator cascade. The compressor 10 raises the pressure to typically 3000 bar (300 MPa) if the intention is to increase the output of the plant or to a level which is lower than 2500 bar (250 MPa) if the intention is to lower the energy spent in compressing the feed.

Figure 2B:
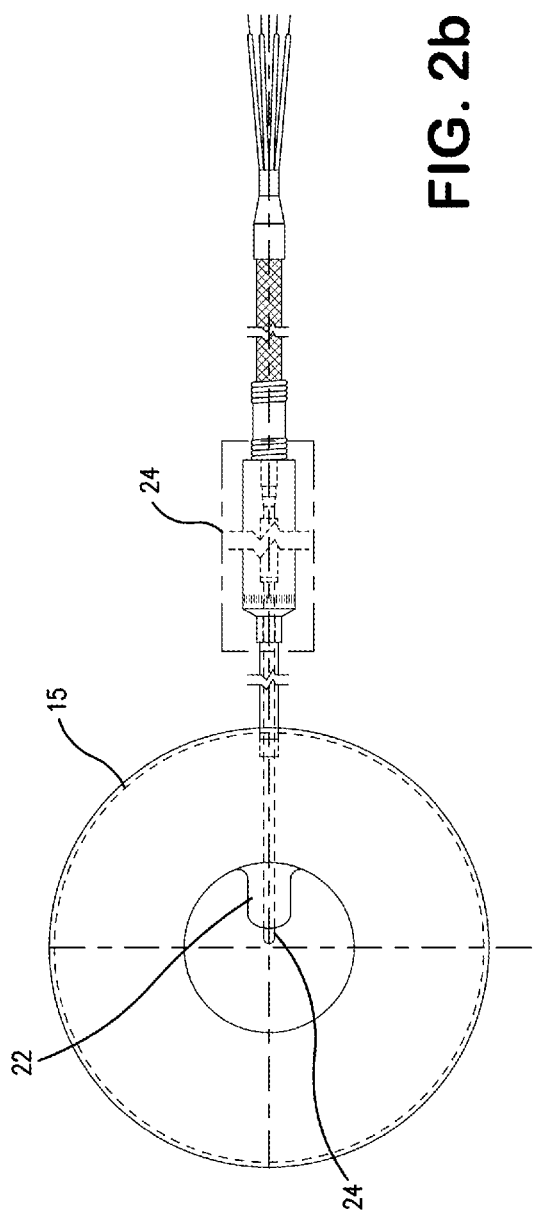
FIG. 2b is a transverse section showing a lens ring with a thermocouple.
Figure 2A:
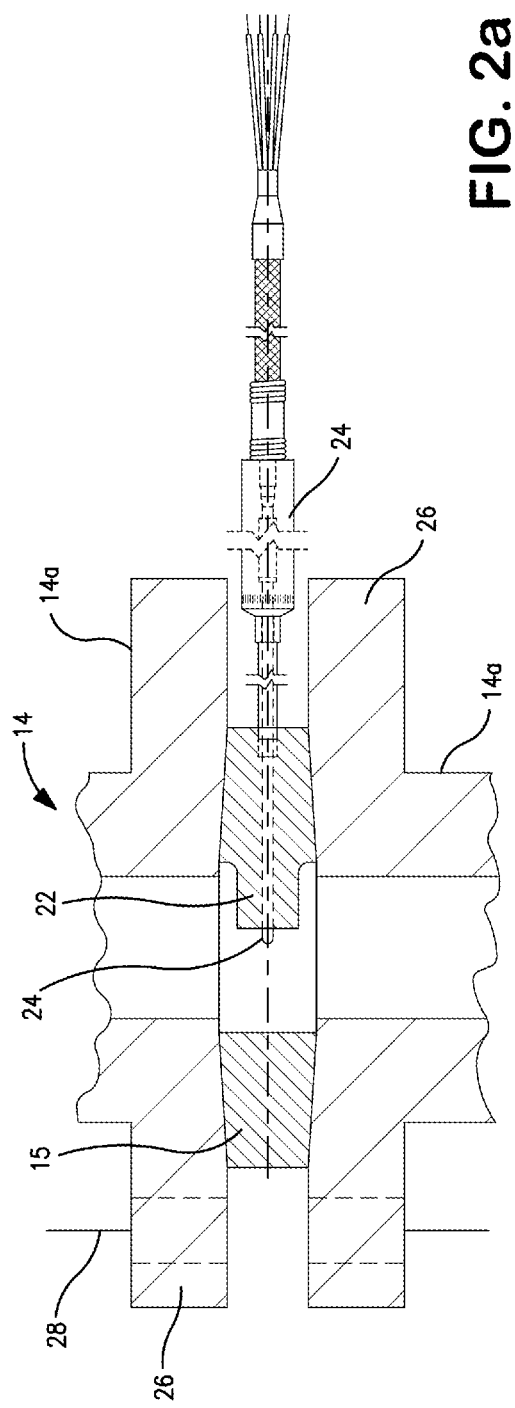
FIG. 2a is a section in a longitudinal direction showing the interconnection between adjacent tube segments of the tubular reactor of FIG. 1.

With reference also to FIGS. 2a and 2b, the compressed feed from secondary compressor 10 is introduced in a tube 14, which comprises a large number of tube segments 14a. The segments 14a are surrounded by heat exchange jackets arranged conventionally and not shown in detail. The jackets form an annular space surrounding the exterior cylindrical wall of the segments 14a. The jackets convey steam for heating or may convey cold water for cooling depending on the function of the different segments 14a. Adjacent segments 14a are spaced by lens rings or gaskets 15. The rings 15 may be modified to permit injection of free radical initiators as shown by way of example at 20 in FIG. 3, injection of side feeds as shown in exemplary fashion at 18a, 18b etc. in FIG. 1 or thermocouples 24 for detecting the temperature as shown in FIGS. 2a and 2b. The tube segments 14a have annular flanges 26 which are connected by bolts at locations such as 28 to clamp and compress the rings 15 between them. The rings 15 having thermocouples 24 are mounted to protrude through inwardly extending projections 22 formed integrally with the ring 15 to expose the sensing end of the thermocouple in the centre of the tube 14 beyond the laminar flow regime prevailing adjacent the tube walls so as to measure temperature accurately with reduced interference from reactor fouling.

The secondary compressor 10 has first conduits for compressing the feed from the primary compressor 4 and passing it to the front end of the tube 14 as the front-feed. The compressor 10 has second conduits for compressing the recycle gas from line 12 in parallel with the compression needed to supply side feed streams 18a, 18b, and 18c for introduction into the tube 14 further downstream from the front feed introduction. Various cooling provisions such as intermediate heat exchangers and the intercoolers remove the heat of compression resulting from the operation of the secondary compressor 10, leading to a feed temp of 50-100° C., and preferably 50-70° C.

The addition of transfer agent to the front feed and the side feeds may be uncoupled using the expedients described in US2003/0114607. Transfer agent may be supplied preferentially to the front feed. The transfer agent is preferably a highly active, chain end incorporating transfer agent such as propionaldehyde or a highly active transfer agent incorporating along the length of the chain such as propylene.

Figure 3:
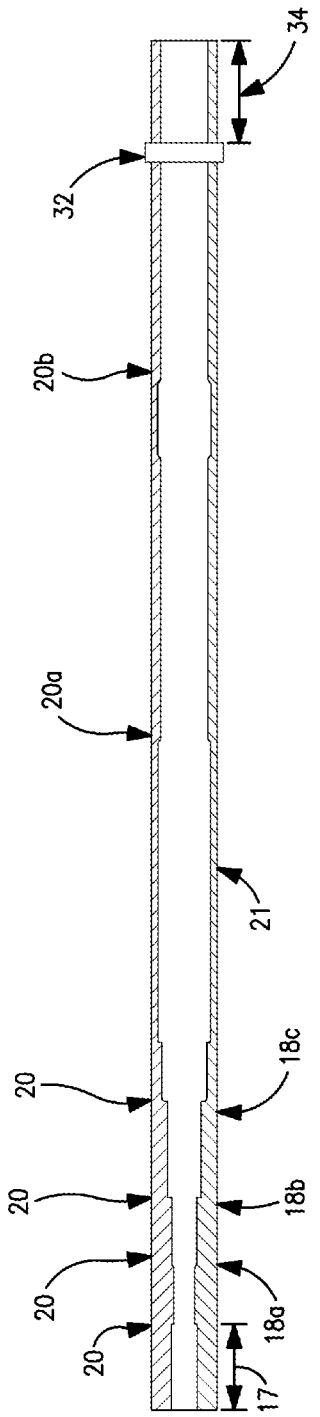
FIG. 3 shows schematically a longitudinal section along the length of the tube with different reaction zones (not to scale)

FIG. 3 shows the overall tube schematically. In the most upstream section a heating zone 17 is formed. The segments 14a of the heating zone 17 are heated by steam at temperatures that progress upwards from the front end of the tube 14 to heat the front feed to the selected reaction start temperature. Following this section an intermediate section 21 follows containing a number of reaction zones, each with an initiator injected point 20 for polymerization. In the intermediate section 21, cool side streams 18a, 18b, and 18c and initiator are supplied. Different reaction zones are created with repeated temperature peaks followed by lengths in which the temperature drops by cooling to near but above the reaction start temperature, see FIG. 4.

The length of the heating zone that occupied approximately 20% of the total tube length before debottlenecking is reduced and may be approximately half that after debottlenecking. The bore of the heating zone may also be reduced in debottlenecking. The cross-section of the internal bore of the heating zone is also generally less than the cross-section inside the segments arranged downstream in the intermediate zone 21 (see FIG. 3).

The mass flow passing through the side streams 18a, 18b and 18c is correspondingly increased relative to that for the front feed supplied to the heating zone at the front end of the tube 14. Less polymerization takes place through conversion of the front feed and more polymerization is due to conversion of the side feeds. The result is that a) less heat is needed to reach the reaction start temperature for that diminished volume of monomer for the front feed and that b) more cool gas is available for feeding as a side stream in a downstream location. The reaction start temperature is reached more quickly and the positions of the first injection point for free radical initiator can be moved upstream. An additional reaction zone with side feed is inserted at the upstream end vacated by the reduction in length of the heating zone 17 using the volume of monomer no longer required for the front feed.

In the intermediate tube section 21 some reaction zones, located more downstream, receive only initiator at 20a and 20b (see FIG. 3) to polymerize residual unreacted monomer in the fluid flowing through the tube 14. These reaction zones are also cooled by the heat exchanger jackets 16 with the reactor contents under single phase condition. The tube 14 is then interrupted and a let down valve 32 inserted. The let down valve 32 is relocated upstream of a final tube section 34, referred to herein as the reduced pressure cooling zone, at the downstream end of the tube. The let down valve 32 lowers the pressure of the effluent to below the single phase pressure in that zone 34 and a gaseous and a liquid phase begin to separate. The zone 34 (that formerly might have served generally for cooling under single phase conditions) has the same or smaller cross section than the tube potion immediately upstream of the let down valve 32 to increase the velocity and turbulence of the effluent. In the zone 34 the effluent is cooled more efficiently than a similar length of tube used under single phase polymerization reaction conditions. The zone 34 may occupy around 50% of the overall tube length.

Transfer agent may be fed to the reaction zones and is preferably fed to and combined preferentially with the front feed in the manner of US2003-0114607. It has been found that this improves the opticals of the polymer product which in turn permits a higher conversion for a given haze level. Thermocouples in the rings 26 permit control of the initiator and side stream temperature and feed rates to allow a desired temperature profile to be established and maintained.

Figure 5:
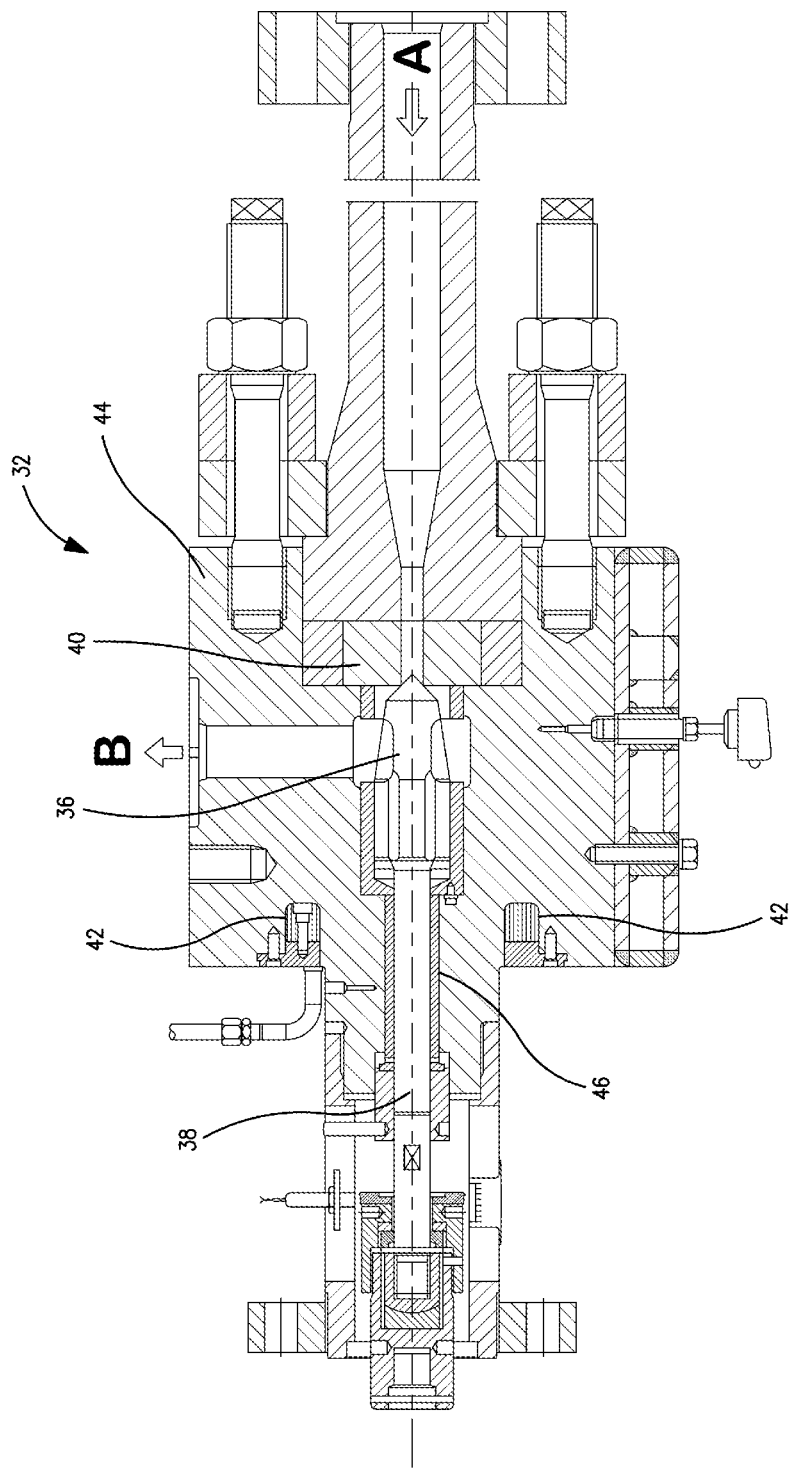
FIG. 5 is cross-section of a let down valve at the downstream end of the reactor segments of FIG. 1 and upstream of product cooler segments.

The let down valve 32 is shown in FIG. 5. The let down valve 34 restricts flow of the mixture formed in the reaction zones which is in a single phase state entering in the direction of arrow A and reduces its pressure for separating into a monomer rich phase and a polymer rich phase for supply to the reduced pressure cooling zone 34 in the direction shown by arrow B. The valve 32 is "bumped" so that the pressure fluctuates and a shockwave is created which loosens any polymer build up upstream in the tube 14. The let down valve 32 has a valve member 36 which is actuated by a valve stem 38 to change the cross-sectional flow area during bumping to vary the pressure inside the tube. The valve member 36 faces an annular valve seat 40 to constrain the flow of reactor effluent. The channels 42 inside the valve housing 42 are cooled by water as a coolant so as to promote the service lifetime of the valve components 46 that are in sealing and sliding engagement with each other.

Figure 4:
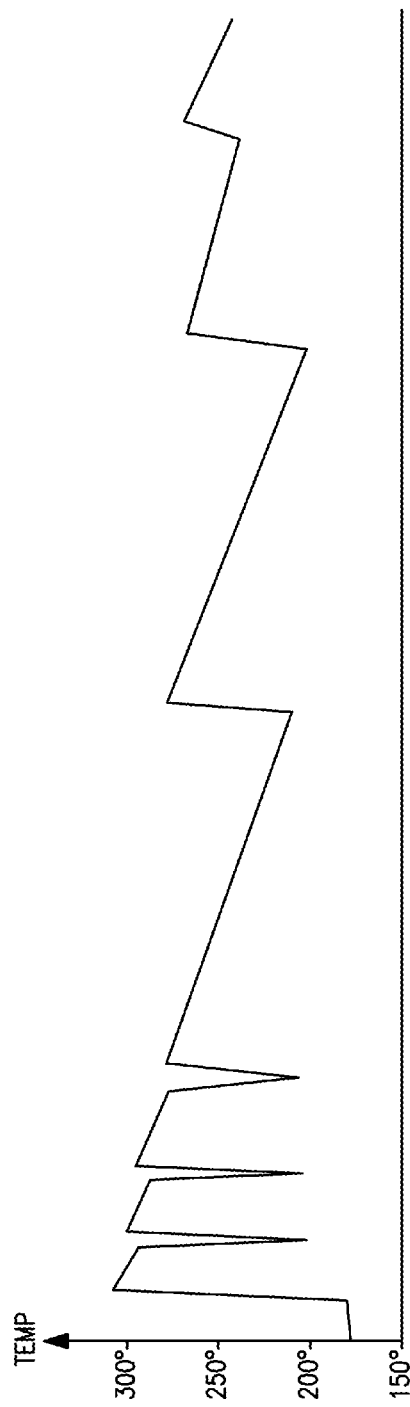
FIG. 4 is typical temperature profile established in the tubular reactor of FIG. 3.

The different injections of monomer and initiator establish a temperature profile which can be determined using the thermocouples shown in FIG. 2b. An example of a resulting temperature profile is shown in FIG. 4. As and when necessary, the temperature in the cooling jackets 16 can be increased temporarily simultaneously in all reaction zones or preferably progressively in sequence by heating the cooling water to above the polymer melting point to loosen any accumulated fouling on the inside tube walls. This may supplement the bumping.

The overall effect of these changes to the operation of the tubular reactor is a possible increase in the conversion and capacity by the use of the additional monomer feed using the additional cool side stream, without additional heating to reach the reaction start temperature and without requiring additional lengths of cooling jackets along the tube to remove the heat of polymerization generated by the conversion of more monomer. The location of the cooled let down valve 32 permits efficient heat removal from the reactor effluent. Alternatively the same changed lay out can be used to lower the operating pressure and reduce the energy consumed by the compressors. The conversion may be raised by 5 to 10%.

Conversion can be further increased by modifying the initiator selection at the final initiator injection point 20. By using for example 5% of DTBP (di-t-butyl peroxide) based on the total concentration of initiator injected at the final initiator injection point 20, from 1 to 3% extra conversion may be extracted depending on the exotherm peak temperature targeted. The additional heat of the polymerization reaction can be accommodated by the cooling arrangements described above. Surprisingly the optical properties may be preserved in spite of such additional conversion.

To explain the modifications in Section C that have the potential of limiting the volume of gas recycled in spite of higher monomer feed rates and/or conversion in more detail, reference is made once again to FIG. 1. The cooled effluent emerging from zone 34 is conveyed to a jet pump 48 which converts the kinetic energy of the effluent into a pumping effect in two different circuits simultaneously. As shown in more detail in FIG. 6, the jet pump 48 has two inlets 50 and 52 for overhead gas streams from different parts of the cascade of polymer separating vessels discussed in more detail later. The combined stream is so expanded further and passed into high pressure separator 54 of the cascade of polymer separating vessels.

The cascade has three separating vessels, with progressively reducing pressure in a downstream direction but without active cooling and hence at a essentially the same temperature in which the polymer will exist in a highly fluid state: the high pressure separator 54 and in addition a medium pressure separator 56 and a low pressure separator 58. In each separator 54, 56, 58 overhead gas is drawn off for recycling. In each separator the liquid molten polymer rich phase is extracted though a conically tapered lower bottom section of the separators 54, 56, and 58.

The hot overhead stream 54a of the high pressure separator 54 is cooled by a heat exchanger 60 such as a shell and tube heat exchanger. A large part 62a of the cooled gas is recycled to the inlet side through line 12 to the secondary compressor 10. Knock-out pots (not shown) are provided for de-waxing the high pressure overhead recycle stream. Another small part 62b of the cooled overhead is connected to the inlet 50 of the jet pump 48 where it quenches the effluent and accelerates phase separation. The line for 62b has a check valve 66 to prevent ingress of effluent in the course of bumping.

The medium pressure separator 56 has an overhead stream 56a which is connected to the inlet 52 of the jet pump 48. The jet pump so raises the pressure of the medium pressure separator overhead 56a to the level of pressure in the high pressure separator overhead and causes that medium pressure separator overhead to be part of the pump-around and the recycle to the secondary compressor 10.

Figure 6:
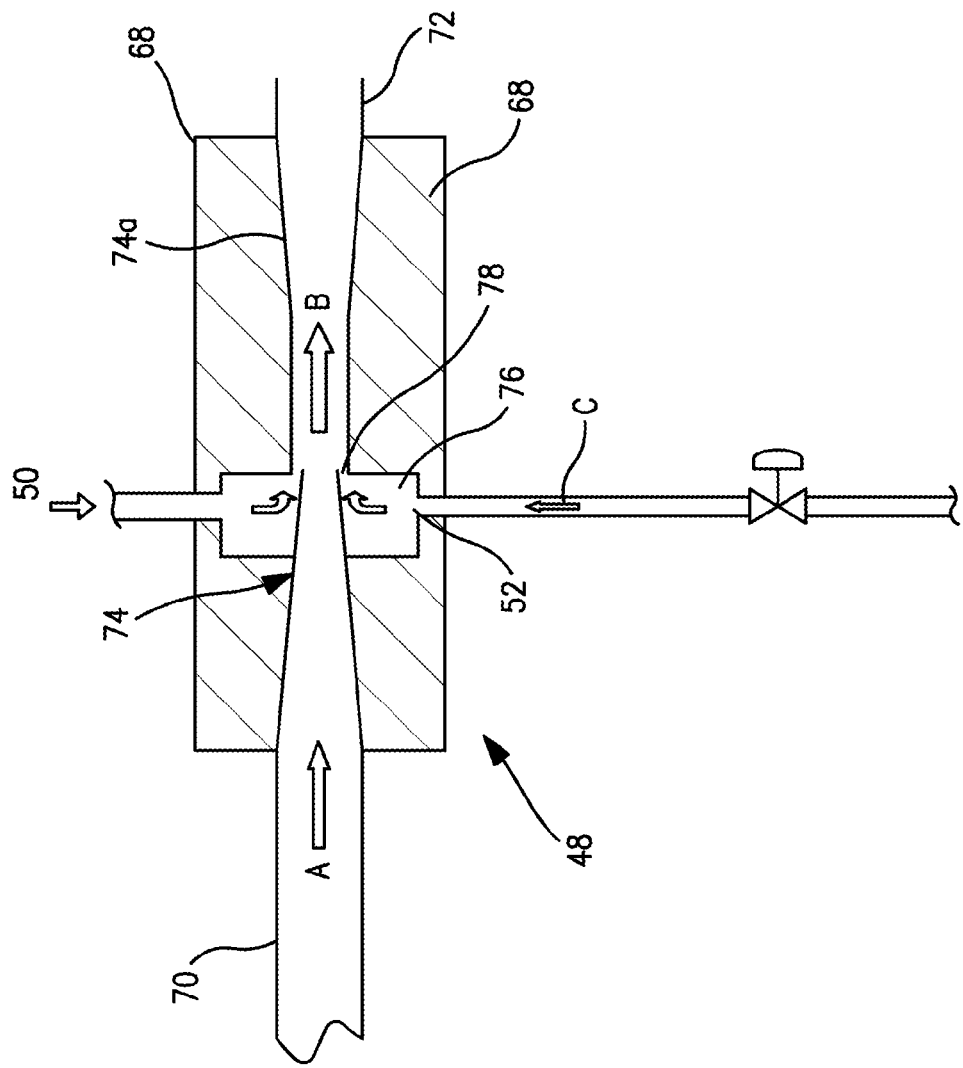
FIG. 6 is a section through a jet pump used in the separation system of the plant of FIG. 1.

With reference to FIG. 6, the jet pump 48 is constructed of high strength steel and comprises a generally cylindrical outer body 68 and a conduit 70 for the effluent from the cooled tube section 26. The inlet conduit 70 inside the body 17 has a tapered portion to form nozzle 72. The flow velocity of the product mixture entering in the direction of arrow A increases in the tapered portion. The effluent leaves the nozzle 72 as a high velocity jet (see arrow B) which projects into an outlet conduit 74 which is coaxial with the nozzle 72 but of slightly larger diameter. After a short distance, the conduit 74 begins to taper outwards in a tapered portion 74a (referred to as a "diffuser") until it is at a diameter similar to that of conduit 70. Surrounding the nozzle 72 is a short cylindrical chamber 76, which is coaxial with nozzle 72 and opens into conduit 74. Nozzle 72 extends through that chamber 76 and terminates just at the entrance of the outlet conduit 74, thereby defining a narrow annular gap 78 between the rim of the nozzle 72 and the conduit 74.

The part of the cooled high pressure separator overhead stream 62b, to be used for quenching, flows into the chamber 76 through the inlet 50. The medium pressure separator overhead 56a flows along a conduit in the direction of arrow C and into the chamber 76 through the inlet 52. The mixture of reactor effluent and overhead recycle streams emerging from nozzle 72 is at a velocity sufficient so that its pressure is lower than that of the off-gas in chamber 76. Both the medium pressure separator overhead 56a and the cooled quench stream 62b accordingly flow through the annular gap 78 and combine with the reactor effluent in diffuser 74a.

The quenched effluent mixture from the jet pump 48 enters the high pressure separator 54 through an inlet set into the cylindrical wall of the high pressure separator 54 and then rapidly separates the mixture into a stream of unreacted monomer gas and a polymer enriched liquid phase which collects in the lower part of the high pressure separator 54. The high pressure separator overhead 54a is at a pressure equal to or slightly higher than the pressure at the inlet of the secondary compressor. Recompression by the primary compressor 4 is not required. The entire medium pressure separator overhead 56a hence ultimately, taking into account any intermediate pump around through the high pressure separator 54, flows into the recycle line 12 and is recycled back to the secondary compressor 10 without prior mechanical compression by a mechanical pump requiring external power.

The increased removal of unreacted monomer in the medium pressure separator and low pressure separator may permit the low pressure separator 58 to operate at a lower pressure than conventional or before the de-bottleneck and to receive a smaller share of the unreacted monomers overall. As an alternative or in combination with the foregoing, the separation cascade may handle greater volumes of effluent before reaching the capacity limit for the low pressure separator overhead recycle circuit back to the primary compressor 4. The amount of overhead gas recycled from the low pressure separator overhead 58a recycled as "purge" gas to the feed line 8 for the primary compressor 4 is reduced as proportion of the overall recycle flows. The low pressure separator overhead 58a is then subjected to de-waxing and heat exchange steps, such as by a shell and tube heat exchangers, to reduce the overhead temperature from a level slightly below that of the effluent in the high pressure separator 54 to a level slightly above ambient.

The combined effect of the separation steps in the cascade of Section C is to increase the proportion of unreacted monomer that is recycled by way of the overhead recycle 12 from the high pressure separator 54 to the inlet of the secondary compressor 10 at the expense of the amount that is recycled through the low pressure separator overhead 58a to the primary compressor 4.

It remains to consider Section A. Recycle "purge" gas arrives at the inlet side of the primary compressor 4 through line 8 for compression in the first stage of the compressor 4. When the low pressure separator overhead pressure is reduced, the volume of gas extracted from the low pressure separator 58 is substantially the same or less as before the de-bottleneck. The second stage of the primary compressor can compress the make up monomer supplied through line 6. The make up monomer arrives at a pressure of from 20 to 80 (2-8 MPa), typically 35 (3.5 MPa), and can undergo compression in the second stage of the primary compressor 4 operating at higher pressures. The recycle gas from the low pressure separator 58 arrives at a lower pressure and is compressed to the extent desired by employing the first stage of the compressor 4 operating at a lower pressure. The higher conversion can thus be accommodated without increasing the compression capacity.

The modifications have the effect of making a more efficient use of the existing length of the tube by injecting more initiator upstream of the let down valve to raise conversion and performing more efficient cooling at the downstream end to remove some of the additional heat of polymerization that higher conversion would generate. At the same time the use of the compressor arrangement for recycle duties and pumping unreacted low pressure monomer back up to the pressure for polymerization is minimized.

When the low pressure separator overhead pressure is lowered, there is a corresponding reduction in the residual unreacted monomer level of the final polymer pellets, reducing releases of volatile organic compounds (VOC). Not only can the plant produce more polymer or produce polymer with a reduced power consumption, the polymer that it does produce may have a lower VOC content while releases of less unreacted monomer residue to the environment or to flare are reduced. The molten polymer from the low pressure separator is passed to a conventional extruder 80 and pelletizer 82.

Details of Operation of the Plant

In operation accurate thermocouple signals are tracked to maximize output to maintain target temperature profile such as that shown by way of illustration in FIG. 4 for a target grade being produced. The existing plant was capable of a conversion of 25-30%. By adopting the modifications above, conversions of more than 35% may be achieved without increasing compressor capacity or electricity consumption or diminishing polymer product quality.

Feed rates for organic peroxide generating free radical and side feeds are controlled to establish together with the various heat exchange jackets the desired temperature profile, see in FIG. 4, for particular grade at the desired conversion/haze balance. The free radical initiator is supplied as a cocktail including a number of different organic peroxides including ones active at the lowest temperature required for the given reaction start temperature and ones active at the highest temperature for the desired peak temperature. Organic peroxides in the cocktail with half time decomposition temperatures in between these two ensure a gradual temperature increase up to the peak as the reactor contents flow through the reaction zone.

A half life time vs. temperature chart can be used to make the peroxide selection, generally keeping the half life time of the peroxide around 1 second at 2000 bar (200 MPa) for the given reaction start temperature and around 0.1 second for the given peak temperature. The greater the difference between the reaction start temperature and the peak temperature, assuming steady initiation during the temperature rise, the higher the exotherm and the higher the conversion in that reaction zone. The difference is generally limited by the extent of cooling available to reduce the peak temperature in one reaction zone to the reaction start temperature for the next reaction zone. In this plant arrangement, the effluent cooling arrangements permit a maximum exotherm at the final reaction zone. For this reason an organic peroxide may be present in the final free radical initiator cocktail that permits additional peak heights to be reached, for example by using di-tertiary butyl peroxide (DTBP) in small amounts. DTBP has a one second half time at 2000 bar (200 MPa) of 251° C. The decomposition behavior of DTBP overall is as shown in Table 1 at 2000 bar (200 MPa):

TABLE 1

| Temperature (degrees C.) | Half life time for decomposition (minutes) | Residual peroxide $[I]$/ Original peroxide $[I_o]$ | Duration of $[I]/[I_o]$ determination (minutes) |
|---|---|---|---|
| 190 | 148 | 0.755 | 60 |
| 200 | 59.08 | 0.499 | 60 |
| 210 | 25.1 | 0.871 | 5 |
| 220 | 10.9 | 0.728 | 5 |
| 230 | 4.9 | 0.493 | 5 |
| 240 | 2.27 | 0.217 | 5 |
| 250 | 1.08 | 0.041 | 5 |

Surprisingly, the increased conversion generated by DTBP has less impact on haze than would normally be expected when the conversion is increased. Thus higher conversions can be targeted at the final initiator injection point in an overall plant design which is capable of subjecting the effluent with the higher conversion levels to an efficient sequence of separation and recycling steps as described previously.

In Table 2 information in brackets indicates the conditions achievable with unmodified plants such as might exist prior to a de-bottleneck. All percentages are mass flow percentages.

| Source/Destination | Approximate Temperature (degrees C.) | Approximate Pressure (bar/kPa) | Share (percent of mass flow) |
|---|---|---|---|
| Make up monomer composition from line 6 to primary compressor 4 | ambient | 35/3.5 | 70-80% of total monomer fed to primary compressor 4 |
| Recycle purge gas from line 8 from low pressure separator 58 | ambient | 1/0.1 | 20-30% of total monomer fed to primary compressor 4 |
| Feed from primary compressor 4 to secondary compressor 10 | 10-20° C. | 300/30 | 40% of total monomer fed to secondary compressor 10 |
| Overhead high pressure separator recycle gas through line 62a | 10-20° C. | 280/28 | 60% of total monomer fed to secondary compressor 10 |
| Front feed and side feeds 18a etc. | 30-70° C. | 2300-3100/230-310 | 100% of total output of secondary compressor 10 |
| Front feed | 60-100° C. | 3000/300 | Less than 35% of secondary compressor 10 output (before modification 43%) |
| Side feeds 18a, etc. | 30-70° C. | 3000-2200/300-220 | More than 75% of secondary compressor 10 output (before modification 57%) |
| Reaction start temperature front feed | 125-210° C. | 3000/300 | |
| Peak temperature ranges in successive reaction zone in tube 14 | 220-315° C. | 3000-2200/300-220 | |
| Upstream of let down valve | 240-270° C. | 2200/220 | 15-20° C. higher than when the let down |

| Source/Destination | Approximate Temperature (degrees C.) | Approximate Pressure (bar/kPa) | Share (percent of mass flow) |
|---|---|---|---|
| | | | valve was at downstream tube end |
| Downstream of let down valve 32 in reduced pressure cooling zone 34 | 270-340° C. | 600/60 | |
| Upstream end of reduced pressure cooling zone 34 | 270-325° C. | 600/60 | |
| Downstream of reduced pressure cooling zone 34 | 230° C. | 500/50 | |
| Jet pump | 220° C. | 500/50 | |
| High pressure separator recycle overhead for LDPE in high pressure separator overhead 54a | 250° C. | 300/30 | 45% based on total flow to primary compressor |
| High pressure separator recycle overhead returned to jet pump 48 | 10-40° C. | 180-280/18-28 | 20% based on total flow through high pressure separator overhead 54a |
| Medium pressure separator overhead | 235-250° C. | 160-180/16-18 | 10% based on total flow to primary compressor |
| Low pressure separator overhead | 230-245° C. | 0.3-0.6/0.03-0.06 gauge | 10% based on total flow to primary compressor |

The amount of fresh monomer feed can be increased by 10%, and the monomer injection into the tube 14 adapted to allow that greater volume of fresh monomer to be converted with a higher degree of conversion without increasing the pumping capacity of the plant 2 or the cooling capacity of the tube 14. At the same time the amount of residual monomer on the final polymer pellets can be reduced to below 1000 ppm.

As result the specific energy consumption is lowered, less steam needs to be generated by the boiler, good product quality can be maintained. Alternatively the polymerization pressure can be reduced to allow the same production capacity as before the modification were made, saving electricity by reducing the compressor duty.

Existing plants can be de-bottlenecked by implementing the modifications emphasized in bold in the previous description, so providing extra capacity without requiring new investment in compressor capacity.

All patent publications referred to herein are incorporated by reference for US legal purposes.

What is claimed is:

1. A method of de-bottlenecking and/or reducing the power consumption of an existing plant for continuously polymerizing olefins using free radical initiators, which plant includes:
   (i) a compressor, with a primary and a secondary compressor, for compressing monomer to a pressure of from 1500 to 3500 bar (150-350 MPa);
   (ii) a tube having a heating zone at the upstream end for providing an internal heating surface for monomer supplied from the compressor and a plurality of lengthwise spaced reaction zones for polymerizing the compressed feed using free radical initiator(s) under single phase conditions and a cooling heat exchanger associated with the reaction zones surrounding the tube for providing an internal cooling surface for removing heat from the polymerization reaction mixture under single phase conditions; and
   (iii) a pressure let-down valve to produce two-phase conditions, a separator for separating effluent from the tube into polymer and unreacted monomer and recycle line for recycling unreacted monomer to the compressor,
characterized in that said de-bottlenecking method involves modifying the downstream part of the tube to include the pressure let down valve within said tube so as to provide a reduced pressure cooling zone for providing two-phase conditions upstream of the downstream end of the tube and an internal cooling surface to cool the effluent inside the tube subsequent to pressure reduction.

2. The method according to claim 1, wherein the reduced pressure cooling zone has a bore which is the same or less than the bore of upstream of the reduced pressure cooling zone for operating in single phase conditions.

3. The method according to claim 1, wherein the reduced pressure cooling zone occupies from 40 to 65% of the total tube length.

4. The method according to claim 1, wherein said pressure let-down valve is cooled by a cooling fluid.

5. The method according to claim 1, further comprising incorporating a jet pump to pump the overhead from an intermediate pressure separator into the stream from cooled effluent from the downstream end of the tube for supply to a high pressure separator, passing at least part of the overhead recycle of the high pressure separator to the inlet side of the secondary compressor; and increasing the proportion of the unreacted monomer recycled to the secondary compressor from the medium pressure separator at the expense of the proportion recycled to the primary compressor from a low pressure separator.

6. The method according to claim 5, wherein said jet pump diverts and pumps around part of the overhead stream from the high pressure separator past the cooling heat exchanger into the stream from the cooled effluent from the downstream end of the tube for supply to the high pressure separator to complement the cooling in the reduced pressure cooling zone.

7. The method according to claim 6, wherein said jet pump is a single jet pump having two side inlets for the diverted high pressure separator overhead and the overhead from the intermediate pressure separator.

8. The method according to claim 6, wherein the jet pump is arranged to divert less than 30% of the overhead stream from the high pressure separator past the cooling heat exchanger.

9. The method according to claim 1, which further comprises reducing the internal heating surface of the heating zone to from 5 to 10% of the total internal surface area of the tube by reducing the length of said heating zone and cooling the remainder of the internal tube surface.

10. The method according to claim 9, wherein the length of the heating zone is reduced by from 25 to 75% of its original length.

11. The method according to claim 9, further comprising introducing an additional side feed in the part of the upstream tube end vacated by said reduction in length of the tube used for heating the compressed feed to the reaction start temperature at the front end to increase of the proportion of compressed feed fed as a side stream.

12. The method according to claim 1, further comprising increasing the supply of fresh make up monomer to the primary compressor without modifying the overall capacity of the primary compressor.

13. A plant for continuously polymerizing olefins using free radical initiators, which plant includes:
  (i) a compressor with a primary and a secondary compressor for compressing monomer to a pressure of from 1500 to 3500 bar (150-350 MPa);
  (ii) a tube having a heating zone at the upstream end for providing an internal heating surface for monomer supplied from the compressor and a plurality of lengthwise spaced reaction zones for polymerizing the compressed feed using free radical initiator(s) under single phase conditions and cooling heat exchanger associated with the reaction zones surrounding the tube for providing an internal cooling surface for removing heat from the polymerization reaction mixture under single phase conditions; and
  (iii) a pressure let-down valve to produce two-phase conditions, a separator for separating effluent from the tube into polymer and unreacted monomer and a recycle line for recycling unreacted monomer to the compressor,
characterized in that said pressure let-down valve is within said tube so as to form a reduced pressure cooling zone for providing two-phase conditions upstream of the downstream end of the tube and an internal cooling surface to cool the effluent inside the tube subsequent to pressure reduction.

14. The plant according to claim 13, wherein said tube is modified such that the internal heated surface of the heating zone is from 5 to 10% of the total internal surface area of the tube by reducing the length of said heating zone and the internal, cooled surface extends to the remainder of the internal tube surface.

15. The plant according to claim 14, further comprising a separator and recycle line for unreacted monomer in the effluent, including a jet pump to receive the effluent from final tube section, a high pressure overhead recycle connected to a high pressure separator via a cooling heat exchanger to an inlet side of the secondary compressor, a medium pressure overhead connected to a medium pressure separator to one inlet of the jet pump, the jet pump having two separate side inlets providing fluid communication with the medium pressure separator overhead and a part of the cooled high pressure overhead recycle, with the overhead of low pressure separator which receives a polymer rich phase from the medium pressure separator being connected to the inlet side of the primary compressor.

16. A process for continuously polymerizing olefins using free radical initiators in a plant which includes:
  (i) a compressor with a primary and a secondary compressor for compressing monomer to a pressure of from 1500 to 3500 bar (150-350 MPa);
  (ii) a tube having a plurality of lengthwise spaced reaction zones for polymerizing the compressed feed and multiple free radical injection points spaced lengthwise along said reaction zones for injecting free radical initiator(s) under single phase conditions and cooling heat exchanger surrounding the tube for removing heat from the polymerization reaction mixture under single phase conditions; and
  (iii) pressure let-down valve to produce two-phase conditions, a separator for separating effluent from the tube into polymer and unreacted monomer and a recycle line for recycling unreacted monomer to the compressor,
which process is characterized by:
  A) feeding from 12 to 40% based on the total mass flow of the feed compressed in the secondary compressor to an upstream end of the tube for lighting off of the feed and feeding the balance of the total volume of the feed compressed in the secondary compressor as side feeds into the tubular reactor;
  B) cooling the polymerization effluent within the tube at the downstream end subsequent to the letting down of the pressure by said pressure let-down valve to produce two-phase conditions within said tube, and fluid-cooling that downstream end externally;
  C) feeding from 50 to 85% based on the total mass flow from the secondary compressor generated by a high pressure separator to the inlet side of the secondary compressor and making up the balance on the total overhead generated by said high pressure separator with monomer compressed by the primary compressor;
  D) pumping the overhead from an intermediate pressure separator through a jet pump into the stream of cooled effluent from the downstream end of the tubular reactor before the effluent enters the high pressure separator;
  E) diverting less than 30% of mass flow of the overhead stream from the high pressure separator with said jet pump past a cooling heat exchanger into the stream of cooled effluent from the downstream end of the tubular reactor for entering the high pressure separator; and
  F) supplying fresh make up monomer to the primary compressor and making up the balance of the total volume supplied to the primary compressor with an overhead stream from a low pressure separator which receives a polymer rich fraction from the intermediate pressure separator.

17. The process according to claim 16, wherein the pressure in the tubular reactor is from 1500 to 2200 bar (150-220 MPa).

18. The process according to claim 16, further feeding at least at the final free radical injection point from 2 to 30% based on the total weight of initiator of an initiator having a 1 second half time decomposition temperature at 2000 bar (200 MPa) of at least 250° C. so as to raise the peak temperature in the final reaction zone to at least 285° C.

* * * * *

UNITED STATES PATENT AND TRADEMARK OFFICE
CERTIFICATE OF CORRECTION

PATENT NO. : 8,445,606 B2
APPLICATION NO. : 13/129270
DATED : May 21, 2013
INVENTOR(S) : Lammens et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 84 days.

Signed and Sealed this
Eighth Day of September, 2015

Michelle K. Lee
*Director of the United States Patent and Trademark Office*